US010021141B2

(12) United States Patent
Wong et al.

(10) Patent No.: US 10,021,141 B2

(45) **Date of Patent: *Jul. 10, 2018**

(54) MANAGING NETWORK RESOURCE ACCESS USING SESSION CONTEXT

(71) Applicant: Cisco Technology, Inc., San Jose, CA (US)

(72) Inventors: Pok Sze Wong, Santa Clara, CA (US); Ramesh Nampelly, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,033

(22) Filed: Jun. 12, 2017

(65) Prior Publication Data

US 2017/0279856 A1 Sep. 28, 2017

Related U.S. Application Data

(63) Continuation of application No. 14/795,264, filed on Jul. 9, 2015, now Pat. No. 9,723,026.

(51) Int. Cl.
*H04L 29/06* (2006.01)

(52) U.S. Cl.
CPC .............. *H04L 63/20* (2013.01); *H04L 63/10* (2013.01); *H04L 65/1003* (2013.01)

(58) Field of Classification Search
CPC ....... H04L 63/20; H04L 63/205; H04L 63/10; H04L 63/105; H04L 63/107; H04L 65/1003
USPC .............................................................. 726/1
See application file for complete search history.

(56) References Cited

U.S. PATENT DOCUMENTS

| | | | |
|---|---|---|---|
| 8,341,270 | B2 | 12/2012 | Mazzaferri et al. |
| 8,418,238 | B2 | 4/2013 | Platt et al. |
| 8,478,734 | B2 | 7/2013 | Niejadlik |
| 8,718,633 | B2 | 5/2014 | Sprigg et al. |
| 8,909,247 | B2 | 12/2014 | Tipton et al. |
| 8,966,590 | B2 | 2/2015 | Janzer |

(Continued)

OTHER PUBLICATIONS

"HandyLock v1.2", www.netputing.com/applications/handylock/?PageSpeed=noscript, downloaded on May 8, 2015, 10 pages.

*Primary Examiner* — Yogesh Paliwal
(74) *Attorney, Agent, or Firm* — Edell, Shapiro & Finnan, LLC

(57) ABSTRACT

A computing device providing a network service to a service area may receive a connection request from a user device and generate a session start request to start a user session in a service domain covering the service area. One or more policy rules may be evaluated to determine whether any rule is applicable to the user device, which includes determining that an authoritative user session has already been established in the service domain. The user session may be established in the service domain for the user device, and at least one permission for access to a controlled network resource may be associated with the user session based on the determination that the authoritative user session has already been established. A request from the user device to access the controlled network resource may be received and access to the controlled network resource may be granted.

20 Claims, 6 Drawing Sheets

(56) References Cited

U.S. PATENT DOCUMENTS

| | | | | |
|---|---|---|---|---|
| 9,049,306 | B1 | 6/2015 | Gueorguieva et al. | |
| 2005/0183143 | A1 | 8/2005 | Anderholm et al. | |
| 2009/0077620 | A1 | 3/2009 | Ravi et al. | |
| 2010/0001063 | A1 | 1/2010 | Bowles et al. | |
| 2011/0185399 | A1 | 7/2011 | Webber et al. | |
| 2013/0309971 | A1* | 11/2013 | Kiukkonen | H04L 63/107<br>455/41.2 |
| 2014/0181290 | A1 | 6/2014 | Wong | |
| 2014/0181910 | A1 | 6/2014 | Fingal et al. | |
| 2014/0337528 | A1 | 11/2014 | Barton et al. | |
| 2017/0013016 | A1 | 1/2017 | Wong et al. | |

* cited by examiner

MANAGING NETWORK RESOURCE ACCESS USING SESSION CONTEXT

CROSS REFERENCE TO RELATED APPLICATION

This application is a continuation of U.S. application Ser. No. 14/795,264 filed Jul. 9, 2015. The entirety of this application is incorporated herein by reference.

TECHNICAL FIELD

The present disclosure relates to network access management.

BACKGROUND

Access to network resources is normally controlled for users of a network. For example, in an enterprise environment, a manager usually inserts a key or swipes a card on a staff's terminal to activate functions at the terminal on arrival and deactivate the functions before he/she goes for a break or leaves for the day. Another example is parental control in a home environment, in which access to the network may be allowed by a parent entering a passcode or based on the time of day to loosely approximate a parent's work and home schedule.

DESCRIPTION OF EXAMPLE EMBODIMENTS

Overview

Techniques are provided for managing access to a network resource. According to one embodiment, a computing device may receive a connection request from a user device. The computing device may provide a network service to a service area and may generate a session start request to start a user session in a service domain covering a service area. One or more policy rules may be evaluated to determine whether any rule is applicable to the user device, which may include determining that an authoritative user session has already been established in the service domain. The user session may be established in the service domain for the user device. At least one permission for access to a controlled network resource may be associated with the user session based on the determination that the authoritative user session has already been established. A request from the user device to access the controlled network resource may be received and access to the controlled network resource may be granted to the user device based on the at least one permission.

Example Embodiments

Authentication, authorization and accounting (AAA) services are used for managing network login. One example AAA implementation is a Remote Authentication Dial In User Service (RADIUS) server, such as an Identity Service Engine (ISE), which may support definition of a policy that governs the authorization (such as in the form of an Access Control List (ACL)). One individual may login to a network and an ISE may obtain ACLs for that individual based on the individual's context (e.g., who, where, what is that individual's device). ISE may also support device fingerprinting and device type profiling classification such as smartphone/wearable, laptop, etc. The ACL may be enforced by the computing devices such as switches/wireless controllers and firewalls. Context information may also be used for granting ACLs. The context information may include the location of the individual, for example, determined based on where the network connectivity is established (such as the location of the access point (AP)), or determined directly by the location of the end device (e.g., in the case of smart phone with GPS equipped). Some AAA implementations, such as a Mobility Services Engine (MSE), may use triangulation from the AP to determine accurate physical location of individual from their wearable or mobile device. As the individual is authorized on the network, the ISE may keep track the individual's active session on the network. When the individual moves or leaves the location, the AP serving the connection would change, or the network would terminate the user session associated with the individual. Embodiments of the present disclosure support definition of policy which may govern authorization (e.g., in the form of ACL) for any individual on a network and the authorization may be based on the individual's own context as well as a plurality of other individual's context.

Figure 1:
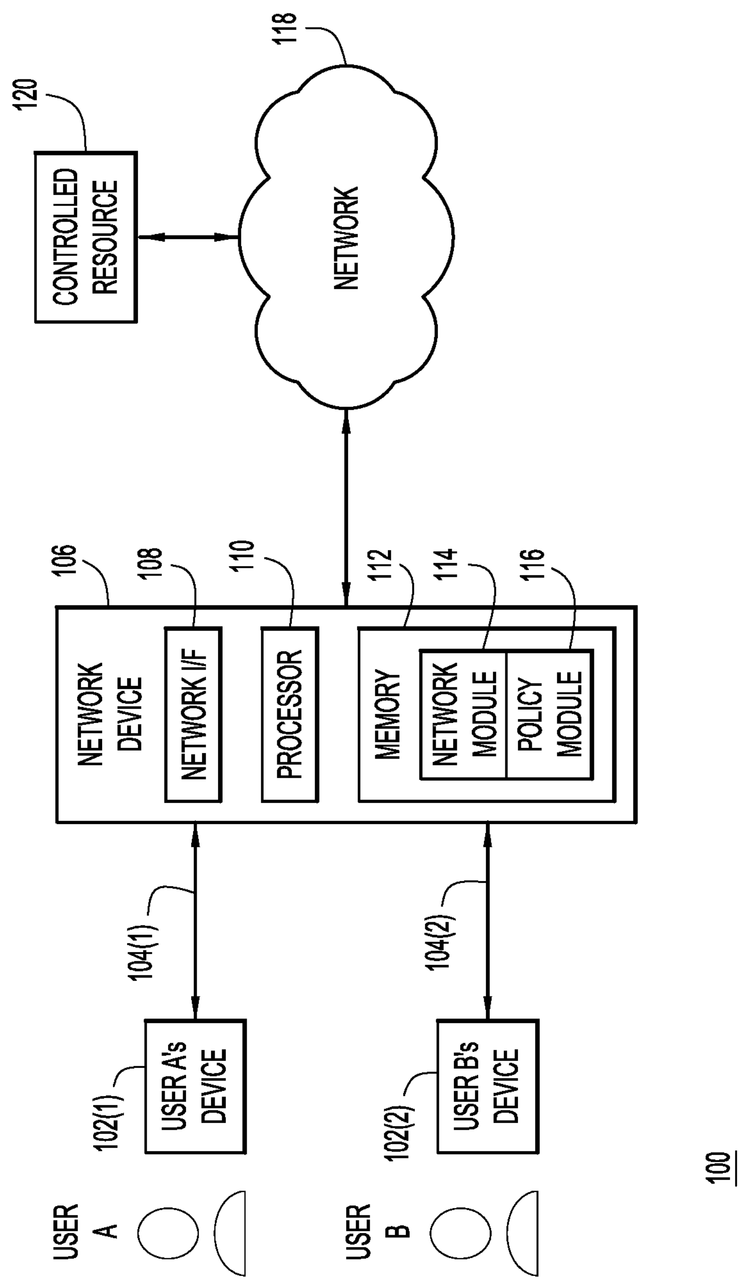
FIG. 1 is a system block diagram illustrating an example computing environment in which the network resource access techniques presented may be employed, according to an example embodiment.

With reference to FIG. 1 there is shown an example computing environment 100 in which access control for a network resource may be implemented. The computing environment 100 may comprise a network device 106 as a gateway to a network 118, which may be connected to a controlled resource 120. Users, such as User A and User B may use their respective user devices 102(1) and 102(2) to connect to the network device 106 and access the network 118 via the network device 106. The user devices 102(1) and 102(2) may be mobile user devices (e.g., laptops, smart phones, pad devices, wearable devices) or desktop devices (e.g., desktop computers, terminal devices). The user devices 102(1) and 102(2) may be connected to the network device 106 via respective connections 104(1) and 104(2). The connections 104(1) and 104(2) may be wireless or wired, depending on the way the user devices 102(1) and 102(2) may be connected. For example, the user device 102(1) may be a desktop computer and the connection 104(1) may be a wired Ethernet connection, and the user device 102(2) may be a mobile computing device and the connection 104(2) may be a wireless connection (e.g., Wi-Fi®). The network 118 may be a local area network (LAN), a wide area network (WAN), Intranet, Internet or Virtual Private Network (VPN). The controlled resource 120 may be, for example, a data storage (e.g., a file sharing location or a database), an application server, a game website, a social media website, a video streaming website.

The network device 106 may be a computing device that comprises a network interface 108, a processor 110, and a memory 112. The network interface 108 may comprise one or more ports, for example, Ethernet ports to enable network communication. The network device 106 may comprise a network module 114 and a policy module 116. The network module 114 may implement logic and/or operations that provide networking functionalities and the policy module 116 may implement logic and/or operations that provide AAA and related functionalities. The network device 106 may further include a network processor application specific integrated circuit (ASIC) that assists in network switching or routing functionalities.

The memory 112 may be read only memory (ROM), random access memory (RAM), magnetic disk storage media devices, optical storage media devices, flash memory devices, electrical, optical, or other physical/tangible memory storage devices. Thus, in general, the memory 112 may comprise one or more tangible (non-transitory) computer readable storage media (e.g., a memory device) encoded with software comprising computer executable instructions and when the software is executed (by the processor 110) it is operable to perform the operations described herein. In particular, the network device 106 performs the some or all operations described herein in connection with FIGS. 1-6 when executing the software stored in memory 112.

Figure 2:
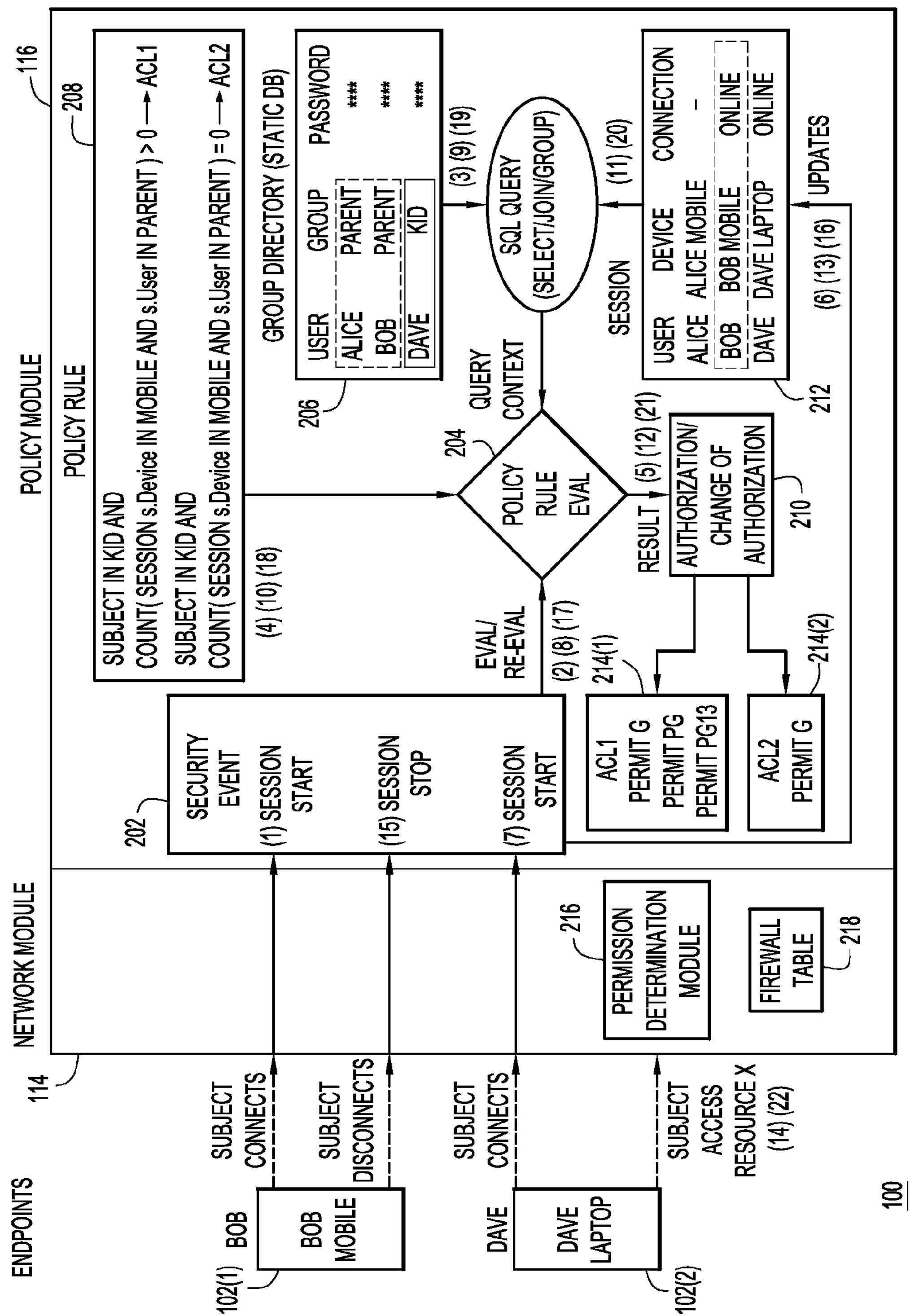
FIG. 2 is an operational flow diagram illustrating the network resource access techniques, according to an example embodiment.

With reference to FIG. 2, there is shown a flow of events in the computing environment 100, according to an example embodiment. As depicted in FIG. 2, the policy module 116 may include an event module 202, a policy evaluation module 204, a directory module 206, a policy rule module 208, an authorization result 210 and a session module 212. The network module 114 may include a permission determination module 216 and a firewall table 218. In this example, the user Bob has managerial responsibility and privileges (e.g., a parent in a home environment) and user Dave is a regular user (e.g., a child). There is an active network session for Bob in the computing environment 100, and this network session may be used to determine whether Dave may be granted access to a controlled network resource.

An example sequence of events may be as follows. These events are identified by reference numerals (1)-(22) in FIG. 2. At (1), Bob may log into the network at a network device, which in this example may be a network access point, and a session start event may be triggered at the event module 202. The network access point may be a network component (e.g., a switch, wireless controller or network module), which may notify the AAA policy module 116 of the session start request. In some embodiments, the session start may be conveyed with a RADIUS access request message, a Simple Network Management Protocol (SNMP) port up, or RADIUS accounting start message. The session start event may trigger a policy evaluation at (2). The policy rule evaluation module 204 may start a policy evaluation process by validating Bob's credential and determining Bob's group membership/entitlement at (3). The group membership information may be implemented in the directory module 206, which for example, may indicate that Bob belongs to the group "Parent."

After determining the group membership, the policy evaluation module 204 may evaluate the policy definitions in the policy rule module 208 at (4). In this example, at this moment, the subject "Bob" is the only one connected in the service domain for the service area and there is no applicable rule that restricts Bob's access. Thus, at (5), Bob may be authorized onto the network with ACL(s) entitled to Bob, for example, permissions that allow Bob to access all available network resources. As indicated at (6), Bob now may have a session on the network and the session table in the session module 212 may be updated accordingly to keep a record of this session.

At (7), another subject Dave, a child, may connect to network. The network access point (e.g., a switch, wireless controller or network module) to which Dave's device is connected may notify the policy module 116 of a session start request. Similar to Bob's connection, the session start may be conveyed with a RADIUS access request message, a SNMP port up, or RADIUS accounting start message and a policy evaluation may be triggered at (8).

At (8), the policy rule evaluation module 204 may start the policy evaluation process again, this time by validating Dave's credentials and determining Dave's group membership. The group membership information in the group directory 206 may indicate that Dave belongs to the group "Kid." After determining the group membership, the policy evaluation module 204 may evaluate the policy rule definitions in the policy rule module 208 at (9) for Dave. In this example, there are two rules with condition "Subject in Kid . . . " that are applicable to Dave. Each rule may have one or more conditions that may be based on a plurality of session contexts including whether there is a session for a user belonging to the group "Parent" and that the session device is a Mobile device. A query may be performed on the session table 212 at (11). In one embodiment, a relational join of the group directory with the session table may be performed to query the session table for users belonging to the group "Parent." Because Bob's mobile session exists in the session table 212, the authorization result 210 may comprise an ACL1 214(1), which may include permissions to access resources classified as "G," "PG," and "PG13." The ACL1 214(1) may be returned, at (12), to the network module 114 for Dave. In one embodiment, for example, the ACL1 214(1) may be in the form of a RADIUS access accept carrying the ACL attribute, and/or the network module 114 may set the ACL accordingly. In one embodiment, the ACL1 214(1) may be stored in the firewall table 218 of the network module 114. At (13), the session table may be updated with Dave's session entry.

When Dave tries to access resource X at (14), a packet with a destination to the resource X may be received at the network module 114. The permission determination module 216 may check the firewall table 218 to determine if an ACL disallowing Dave's access to resource X exists, and the permission determination module 216 permits or denies the traffic accordingly.

At (15), Bob may disconnect from the network. This may cause a session stop event to be generated in the policy module 116, for example, in the form of SNMP port down, RADIUS accounting stop, etc. The session table 212 may be updated to remove Bob's session (or change the status to indicate that Bob's device is not online) at (16). The session stop event may also trigger a re-evaluation of one or more policy rules affected by the session stop event at (17). The policy rule evaluation module 204 may re-evaluate the policy rules at (18) to determine if there is any session that should be affected, for example, whether there is any session for users in the "Kid" group. At (19), a query against the group directory 206 and session table 212 may be performed and it may be determined that Dave's session is affected. Now with Bob's session gone (or becoming inactive), there may be no active session for users in the "Parent" group with a mobile device, such that the first rule in the policy rule module 208 will no longer be applicable. However, a query at (20) may determine that Dave's session satisfies the second rule in the situation. Therefore, the policy evaluation module 204 at (21) may generate the authorization result 210 comprising the ACL2 214(2), and the ACL1 214(1) previously granted to the Dave's session may be revoked. Consequently, the permission to access the controlled network resource previously granted to the Dave's session may be revoked. The ACL2 214(2) may be assigned to Dave's session and a change of authorization (including granting of new permissions and revocation of the previous permissions) may be performed, for example, in the form of a RADIUS change of authorization packet sent to the network module 114, or adjustment of firewall table 218 in the network module 114. Dave may try to access resource X at (22). However, when the packet is received at the network module 114, the permission determination module 216 may check the firewall table 218 and deny the traffic.

Embodiments of the computing environment 100 may be used in home and education environments. At home, parental control may be implemented to allow access to certain Internet or TV program only if one parent is also at home. In the education environment, access to some network content may be allowed only if a teacher is present to facilitate and supervise the consumption of the content. In some embodiments, it may be used to protect children; in some other embodiments, it may also be used due to licensing arrangement with a content provider.

Figure 3:
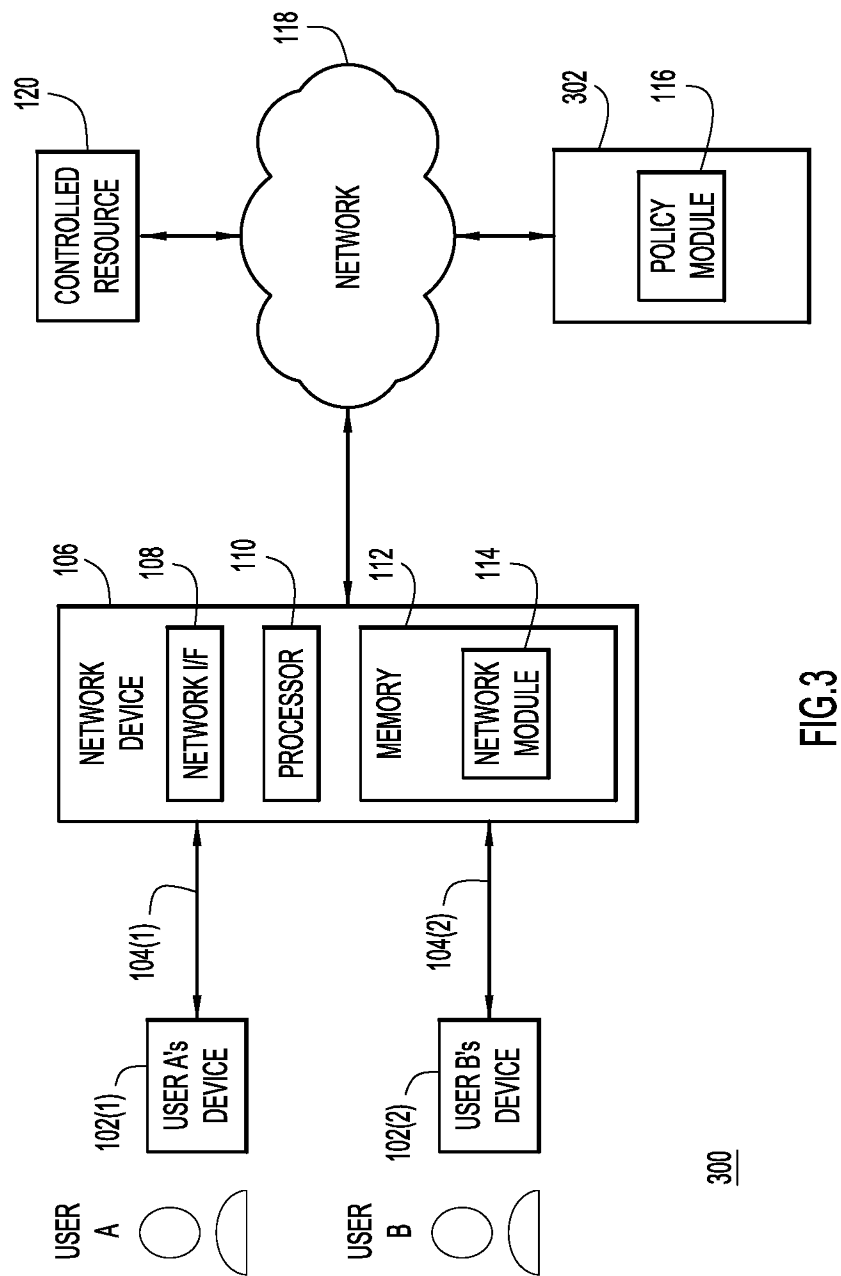
FIG. 3 is a system block diagram illustrating another computing environment in which the network resource access techniques presented may be employed, according to an example embodiment.

With reference to FIG. 3, there is an illustration of another example computing environment 300 in which network resource access control may be implemented. The computing environment 300 may also comprise a network device 106, a network 118, and a controlled resource 120. Users, such as User A and User B may use their respective user devices 102(1) and 102(2) to connect to the network device 106 and access the network 118 via the network device 106. In contrast to the computing environment 100, the computing environment 300 may further comprise a computing device 302 to host the policy module 116. In some embodiments, the computing device 302 may be a server computer configured with one or more computer processors and one or more memories, and the policy module 116 may be implemented as software module stored in the one or more memories and executed by the one or more computer processors. In one example, the computing device 302 is the aforementioned Identity Service Engine (ISE). The computing device 302 may be part of a cloud-based or data center computing system.

Figure 4:
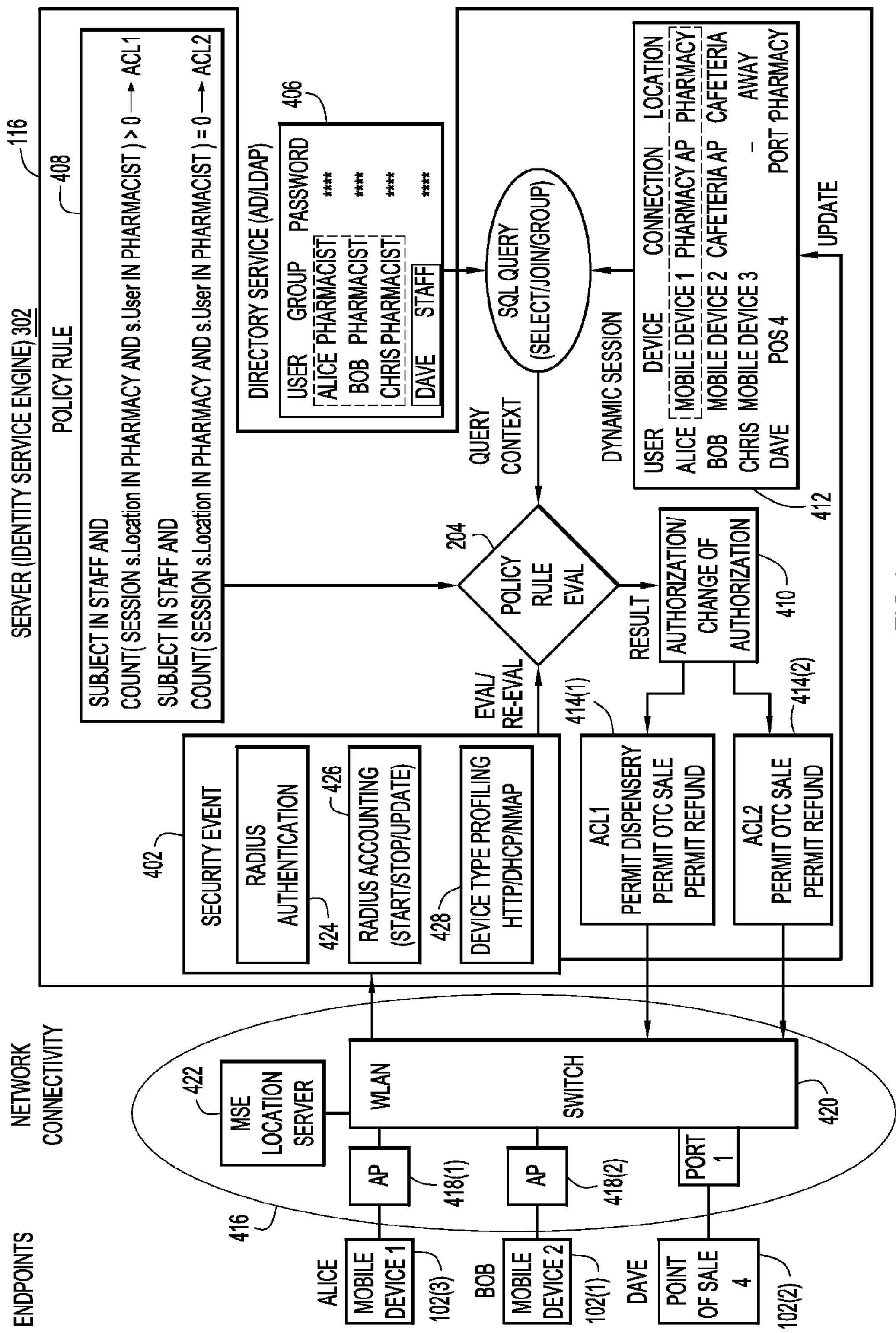
FIG. 4 is another operational flow diagram illustrating the network resource access techniques, according to an example embodiment.

With reference to FIG. 4, there is shown an operational flow according to the techniques presented herein in the computing environment 300 of FIG. 3. As depicted in FIG. 4, the user devices in the computing environment 300 may be connected to a network 416 via access points (APs) 418(1), 418(2) or a port on a switch 420. The network 416 may be a LAN, WAN, Internet, Intranet, or VLAN. The network 416 may be connected to a server 302. The server 302 may be implemented as an AAA server and be configured to execute the policy module 116. The policy module 116 in the computing environment 300 may comprise an event module 402, a policy evaluation module 404, a policy rule module 408, an authorization result 410 and a session module 412. The event module 402 may include RADIUS Authentication module 424, RADIUS Accounting module 426 and Device Type Profiling module 428. The RADIUS Authentication module 424 may implement authentication techniques in accordance with the RADIUS protocol. The RADIUS Account module 426 may implement logic to keep track of user sessions for accounting purposes (e.g., for billing). The Device Type Profiling module 428 may implement logic to identify user device types based on network protocols, such as Hypertext Transfer Protocol (HTTP), Dynamic Host Configuration Protocol (DHCP), and/or Network Mapper (NMAP). Although not shown, the events, such as the session start, session stop events, are still being triggered and propagated by the event module 402.

In contrast to the computing environment 100, a directory service 406 may be used in the computing environment 300 instead of the group directory 206. The directory service 406 may be a separate service and not part of the policy module 116. In one embodiment, the directory service 406 may be an existing enterprise directory service, such as an Active Directory (AD) and/or The Lightweight Directory Access Protocol (LDAP) directory.

The policy evaluation module 404 may be implemented similarly to its counterpart policy evaluation module 204 in the computing environment 100, with an exception that the policy evaluation may be performed by querying the directory service 406 instead of the group directory 206. The policy rule module 408 may comprise policy rule definitions, just as its counterpart policy rule module 208. The authorization result 410 may include ACLs 414(1) and/or 414(2) depending on whether the policy rule for ACL1 or ACL2 may be satisfied at any particular moment.

Although not shown, the network 416 may also comprise a permission determination module and a firewall table at a network device (as shown in FIG. 2), and ACLs may be used to configure the firewall table and control access to network resources. It should be noted that the network 416 may also include a location determination service, such as the Mobility Services Engine (MSE) location server 422. Because there may be many network access points in a business environment, location information for any mobile device connected to the network 416 may be associated with the user sessions as shown in the session table 412. It should be noted that one or more service areas may be set up in the business environment and the user sessions may be created in service domains corresponding to service areas.

As the rules in the policy rule module 408 and directory service 406 indicate, one application of the computing environment 300 is in a pharmacy and the ACLs 414(1) and 414(2) may be related to accessing the network to perform certain operations in a pharmacy. In this example embodiment, users Alice, Bob and Chris may be pharmacists and Dave may be a staff member. Many jurisdictions laws, for example, may require a pharmacist be on premise to dispense prescriptions but allow a pharmacy to remain open without pharmacists on duty for other patient-related services, including receipt of new written prescriptions, preparation of prescriptions for final verification by the pharmacist and delivery of prescription medications that have been verified by the pharmacist. Authorization of the staff's login session on the point of sale (POS) terminal may need to be restricted, for example, and access to the dispensing function may be prevented while the pharmacist is away and allowed when the pharmacist is present. Other patient-related services, however, can be performed at all times with the staff's login. In this particular example shown in FIG. 4, Dave may be at a POS device and whether he has permission to perform dispensary may depend on whether he has been given ACL1, which may depend on whether at least one of Alice, Bob and Chris has an active session. As shown in the session table 412, the session information for each user device may also include location information. In one embodiment, a cafeteria may be part of the premise of the pharmacy and Bob's active session alone may be enough to let Dave obtain ACL1, even if Alice ends her session.

It should be noted that the computing environment 300 uses a pharmacy merely as an example. Many other businesses may also implement a computing environment similar to the computing environment 300 by defining their policy rules for their respective needs, for example, to restrict certain transactions from being performed by staff if no supervisor is on site. The computing environment 300 may also be used in a home environment, and the location information may be determined by the access points in a home network to which the user devices are connected.

Figure 5:
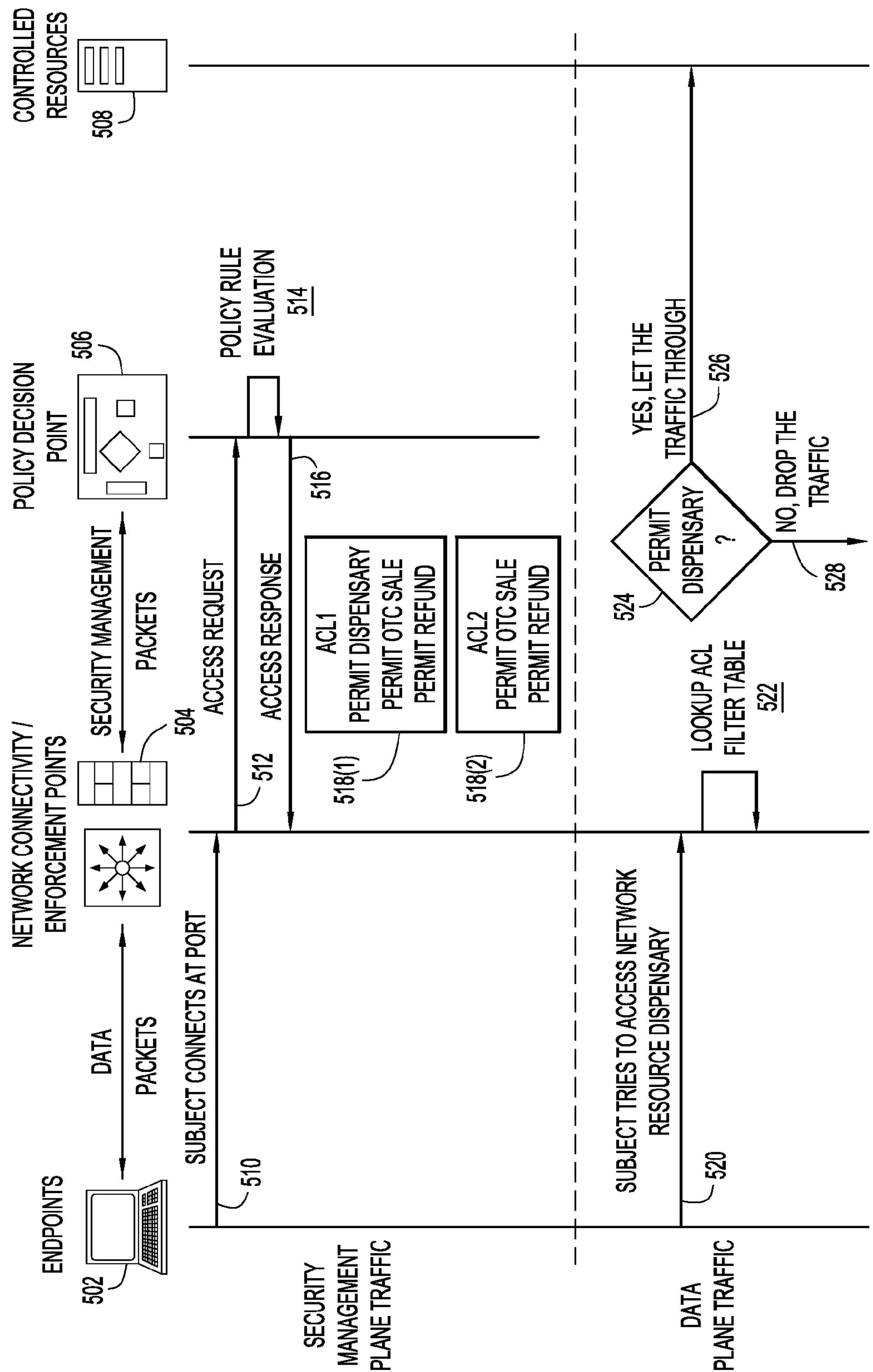
FIG. 5 is a sequence diagram illustrating sequence of events and communication between different components of a computing environment, according to an example embodiment.

With reference to FIG. 5, there is an illustration of a sequence diagram illustrating a sequence of events and communication between different components, such as in of the computing environments 100 and 300 shown in FIGS. 2 and 4. The endpoints 502 (e.g., the user devices) may communicate with the network connectivity/enforcement point 504 (e.g., the network module 114 or network 416), the network connectivity/enforcement point 504 may communicate with the policy decision point 506 (e.g., the policy module 116) by security management packets, and the endpoints 502 may access the controlled resource 508 if the endpoints 502 have been given proper permissions (e.g., in ACL(s)). In the security management plane, at 510, the endpoints 502 may connect to a port of the network connectivity/enforcement point 504, which may represent that a user (e.g., a subject) may try to log into a network. At 512, the network connectivity/enforcement point 504 may send an access request to the policy decision point 506, which may perform a policy rule evaluation at 514 and return an access accept response at 516. The response may include ACL1 518(1) and/or ACL2 518(2), for example, depending on the currently-existing sessions in the network. In the data plane, at 520, the endpoints 502 may try to access a network resource (e.g., perform a dispensary in a pharmacy). At 522, the network connectivity/enforcement point 504 may lookup ACLs in the firewall (or filter) table and at 524, whether the access is granted may be determined based on ACLs. If a proper ACL has been associated with the endpoints 502, data traffic accessing the controlled resource 508 may be permitted through the firewall. If, however, the network connectivity/enforcement point 504 determines at 524 that the endpoints 502 are not associated with any ACL granting access to the controlled resource 508, data traffic accessing the controlled resource 508 may be denied and the traffic may be dropped by the network connectivity/enforcement point 504.

Figure 6:
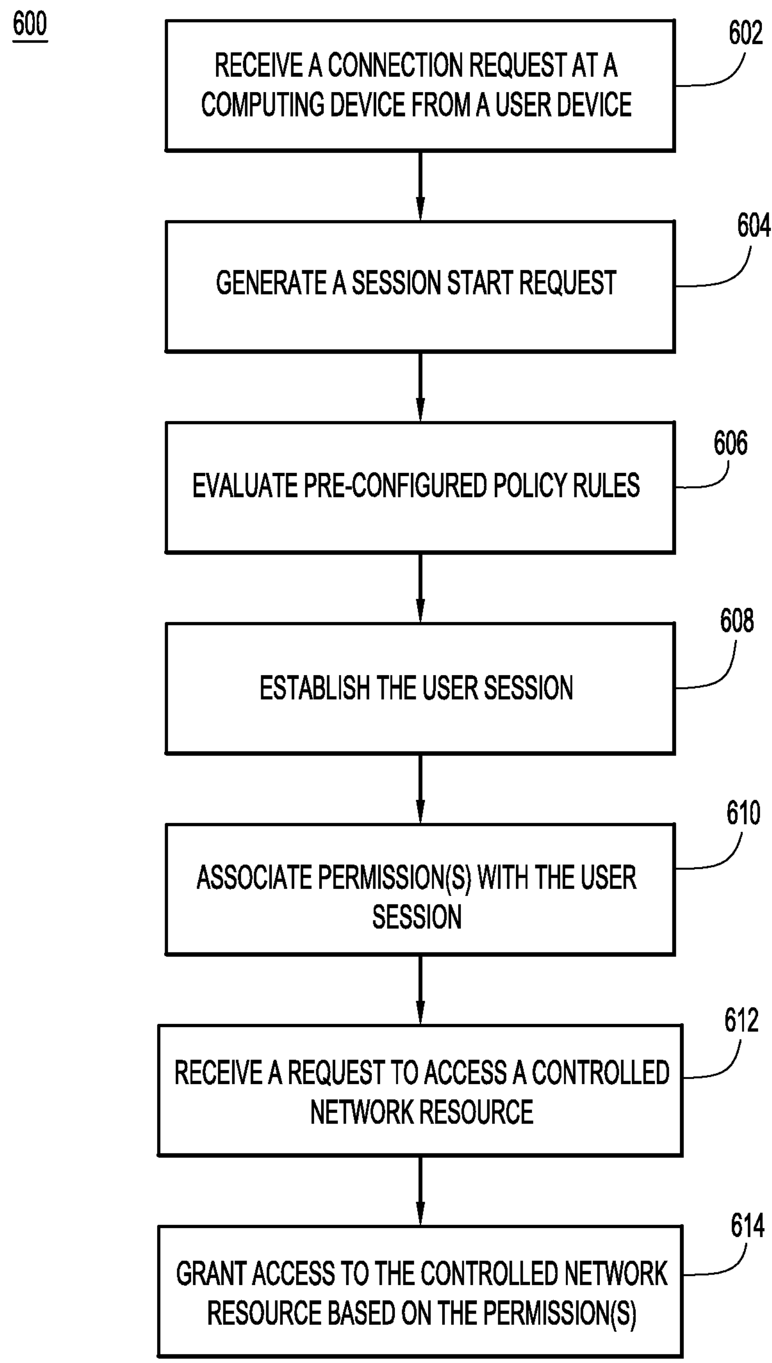
FIG. 6 is a flowchart of a method of enforcing network resource access control, according to an example embodiment.

FIG. 6 is a flowchart of an example method 600 of enforcing network resource access control, according to an example embodiment. Method 600 may be performed by a computing device (e.g., a network device or a server machine) in a network. At 602, a connection request from a user device may be received at a computing device. For example, as described herein, a user device may connect to a wireless access point or a port of a network device and the network device may provide a network service to a service area, such as but not limited to, a home or a business premise. At 604, a session start request may be generated. The session may be a user session in a service domain covering the service area. At 606, one or more pre-configured policy rules may be evaluated. For example, as described herein, the pre-configured policy rules may be evaluated to determine whether any rule is applicable to the user device. The evaluation may include determining that an authoritative user session has already been established in the service domain. At 608, the user session may be established. At 610, one or more permissions may be associated with the user session based on the determination that the authoritative user session has already been established. In some embodiments, the one or more permissions may include at least one permission for accessing a controlled network resource. At 612, a request to access the controlled network resource may be received from the user device, and at 614 access to the controlled network resource may be granted to the user device based on the at least one permission.

The techniques provided herein may provide a way for network/security management in which access to certain network resources using some computing devices may be controlled based on presence or absence of another individual (or individuals) at the location by means of access session management. In addition to the home network and pharmacy examples described above, other environments may also implement the access control techniques described herein. For example, in some businesses a manager (or a person delegated with administrative duties) may be entrusted to be the first to unlock the office and last to leave and lock up. An example of such an office may be a laboratory. In some implementations, the laboratory may have a further requirement that access by staff to the laboratory must be accompanied by a manager/supervisor to badge the staff into the laboratory. According to one example embodiment, any individual entering and exiting the restricted area may be tracked, including both the staff and supervisor. In addition, if a supervisor/manager is already inside the restricted area then others could be automatically granted access. Such an example embodiment may also implement logic to enforce a requirement that ingress access to a restricted area by staff is preconditioned upon presence of at least one supervisor and egress access out of the restricted area of the supervisor is preconditioned upon the absence of staff. In this embodiment, the manager may be required to be the last to leave the restricted area and any access to the restricted area may be blocked once the manager has left.

In summary, in one form, a method is provided comprising: receiving a connection request at a network device from a user device, the network device providing a network service to a service area; generating a session start request to start a user session in a service domain covering the service area; evaluating one or more policy rules to determine whether any rule is applicable to the user device, including determining that an authoritative user session has already been established in the service domain; establishing the user session in the service domain for the user device; associating at least one permission to the user session based on the determination that the authoritative user session has already been established, the at least one permission being for access to a controlled network resource; receiving a request from the user device to access the controlled network resource; and granting access to the controlled network resource to the user device based on the at least one permission.

In summary, in another form, an apparatus is provided comprising: one or more network ports configured to send/receive data packets to/from a communication network; a processor coupled to the network ports, and configured to: receive a connection request from a user device, the network device providing a network service to a service area; generate a session start request to start a user session in a service domain covering the service area; evaluate one or more policy rules to determine whether any rule is applicable to the user device, including determining that an authoritative user session has already been established in the service domain; establish the user session in the service domain for the user device; associate at least one permission to the user session based on the determination that the authoritative user session has already been established, the at least one permission being for access to a controlled network resource; receive a request from the user device to access the controlled network resource; and grant access to the controlled network resource to the user device based on the at least one permission.

In summary, in yet another form, a non-transitory computer readable storage media is provided that stores instructions that, when executed by a processor of a network device, cause the processor to: receive a connection request from a user device, the network device providing a network service to a service area; generate a session start request to start a user session in a service domain covering the service area; evaluate one or more policy rules to determine whether any rule is applicable to the user device, including determining that an authoritative user session has already been established in the service domain; establish the user session in the service domain for the user device; associate at least one permission to the user session based on the determination that the authoritative user session has already been established, the at least one permission being for access to a controlled network resource; receive a request from the user device to access the controlled network resource; and grant access to the controlled network resource to the user device based on the at least one permission.

It is to be understood that the software (e.g., network module, policy module) of the embodiments may be implemented in any desired computer language and could be developed by one of ordinary skill in the computer arts based on the functional descriptions contained in the specification and flow charts illustrated in the drawings. Further, any references herein of software performing various functions generally refer to computing systems or processors performing those functions under software control. The computing systems of the embodiments may alternatively be implemented by any type of hardware and/or other processing circuitry.

The various functions of the network device or other computing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the embodiments may be distributed in any manner among the various computing systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the embodiments (e.g., network module, policy module) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The network may be implemented by any number of any type of communications network (e.g., LAN, WAN, Internet, Intranet, VPN, etc.). The network device or other computing systems of the embodiments may include any conventional or other computing devices to communicate over the network via any conventional or other protocols. The network device or other computing systems may utilize any type of connection (e.g., wired, wireless, etc.) for access to the network. Local communication media may be implemented by any suitable communication media (e.g., local area network (LAN), hardwire, wireless link, Intranet, etc.).

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises," "comprising," "includes," "including," "has," "have," "having," "with" and the like, when used in this specification, specify the presence of stated features, integers, steps, operations, elements, and/or components, but do not preclude the presence or addition of one or more other features, integers, steps, operations, elements, components, and/or groups thereof.

The embodiments may be a system, a method, and/or a computer program product. The computer program product may include a computer readable storage medium (or media) having computer readable program instructions thereon for causing a processor to carry out aspects of the embodiments. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Aspects of embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. In another example, the modules of example embodiments may be in the form of firmware that is processed by Application Specific Integrated Circuits (ASICs), which may be integrated into a circuit board. Alternatively, the modules of example embodiments may be in the form of one or more logic blocks included in a programmable logic device (e.g., a FPGA).

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:

establishing, at a computing device, a user session in a service domain covering a service area to which the computing device provides a network service;

determining whether an authoritative user session has already been established in the service domain;

if the authoritative user session has not already been established in the service domain, associating, to the user session, an access control list (ACL) that does not define at least one permission to the user session;

receiving a request from a user device to access a controlled network resource; and based on whether the ACL defines the at least one permission for access to the controlled network resource, permitting or denying, to the user device, access to the controlled network resource.

2. The method of claim 1, wherein:

if the authoritative user session has not already been established in the service domain:

permitting or denying access includes denying, to the user device, access to the controlled network resource based on the ACL.

3. The method of claim 1, further comprising:

if the authoritative user session has already been established in the service domain:

associating an ACL that defines the at least one permission to the user session.

4. The method of claim 3, wherein:

if the authoritative user session has already been established in the service domain:

permitting or denying access includes permitting, to the user device, access to the controlled network resource based on the ACL that defines the at least one permission to the user session.

5. The method of claim 4, further comprising:

if the authoritative user session has already been established in the service domain:

determining that an authoritative user device that established the authoritative user session has left the service area; and revoking the access to the controlled network resource previously permitted to the user session.

6. The method of claim 1, further comprising:

receiving a connection request at the computing device from the user device; and generating a session start request to start the user session.

7. The method of claim 1, wherein the service area is a home and the authoritative user session is a session for a person with authority at the home.

8. The method of claim 1, wherein the service area is a business premise and the authoritative user session is a session for a manager.

9. An apparatus comprising:

one or more network ports to send/receive data packets to/from a communication network; and a microprocessor coupled to the one or more network ports, the microprocessor configured to:

establish, at a computing device, a user session in a service domain covering a service area to which the computing device provides a network service;

determine whether an authoritative user session has already been established in the service domain;

if the authoritative user session has not already been established in the service domain, associate, to the user session, an access control list (ACL) that does not define at least one permission to the user session;

receive a request from a user device to access a controlled network resource; and based on whether the ACL defines the at least one permission for access to the controlled network resource, permit or deny, to the user device, access to the controlled network resource.

10. The apparatus of claim 9, wherein the microprocessor is further configured to:

if the authoritative user session has not already been established in the service domain:

permit or deny access by denying, to the user device, access to the controlled network resource based on the ACL.

11. The apparatus of claim 9, wherein the microprocessor is further configured to:

if the authoritative user session has already been established in the service domain:

associate an ACL that defines the at least one permission to the user session.

12. The apparatus of claim 11, wherein the microprocessor is further configured to:

if the authoritative user session has already been established in the service domain:

permit or deny access by permitting, to the user device, access to the controlled network resource based on the ACL that defines the at least one permission to the user session.

13. The apparatus of claim 12, wherein the microprocessor is configured to:

if the authoritative user session has already been established in the service domain:

determine that an authoritative user device that established the authoritative user session has left the service area; and revoke the access to the controlled network resource previously permitted to the user session.

14. The apparatus of claim 9, wherein the microprocessor is further configured to:

receive a connection request at the computing device from the user device; and generate a session start request to start the user session.

15. A non-transitory computer readable storage media encoded with instructions that, when executed by a processor of a computing device, cause the processor to:

establish, at the computing device, a user session in a service domain covering a service area to which the computing device provides a network service;

determine whether an authoritative user session has already been established in the service domain;

if the authoritative user session has not already been established in the service domain, associate, to the user session, an access control list (ACL) that does not define at least one permission to the user session;

receive a request from a user device to access a controlled network resource; and based on whether the ACL defines the at least one permission for access to the controlled network resource, permit or deny, to the user device, access to the controlled network resource.

16. The non-transitory computer readable storage media of claim 15, wherein the instructions further cause the processor to:

if the authoritative user session has not already been established in the service domain:

permit or deny access by denying, to the user device, access to the controlled network resource based on the ACL.

17. The non-transitory computer readable storage media of claim 15, wherein the instructions further cause the processor to:

if the authoritative user session has already been established in the service domain:

associate an ACL that defines the at least one permission to the user session.

18. The non-transitory computer readable storage media of claim 17, wherein the instructions further cause the processor to:

if the authoritative user session has already been established in the service domain:

permit or deny access by permitting, to the user device, access to the controlled network resource based on the ACL that defines the at least one permission to the user session.

19. The non-transitory computer readable storage media of claim 18, wherein the instructions further cause the processor to:

if the authoritative user session has already been established in the service domain:

determine that an authoritative user device that established the authoritative user session has left the service area; and revoke the access to the controlled network resource previously permitted to the user session.

20. The non-transitory computer readable storage media of claim 15, wherein the instructions further cause the processor to:

receive a connection request at the computing device from the user device; and generate a session start request to start the user session.

* * * * *